July 9, 1968
M. ANNIS ET AL  3,391,975
SIMPLE MICROSCOPE HAVING SUPPORT BLOCK FOR ADJUSTABLE
MAGNIFIER LENS AND ADJUSTABLE ILLUMINATING MIRROR
Filed Sept. 1, 1964
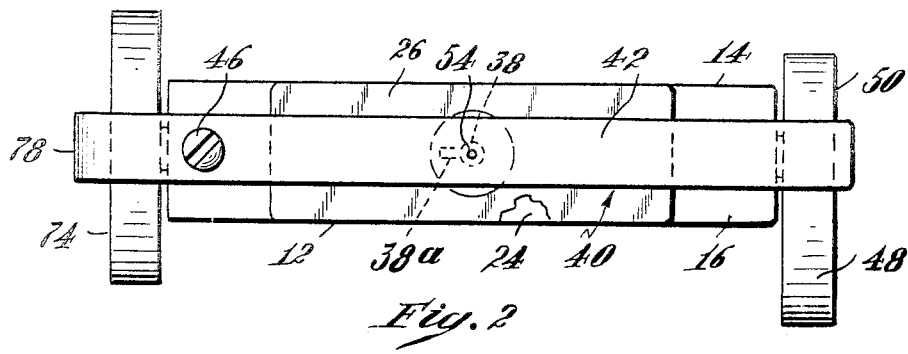
Fig. 2
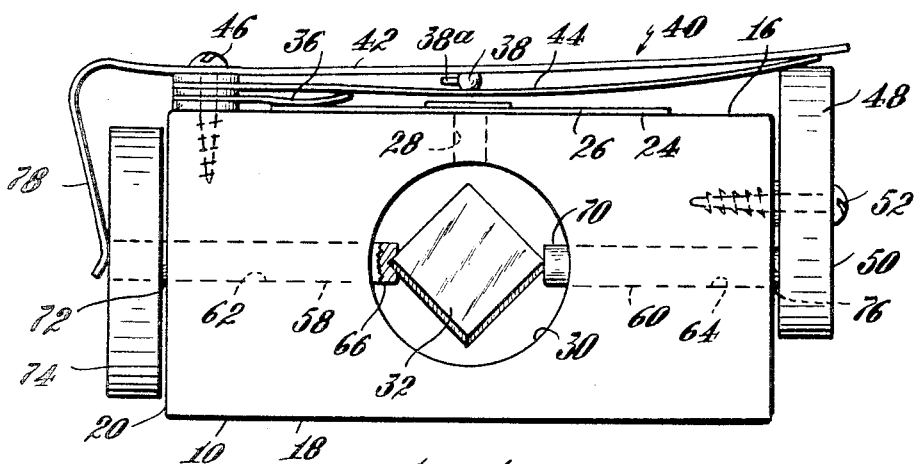
Fig. 1
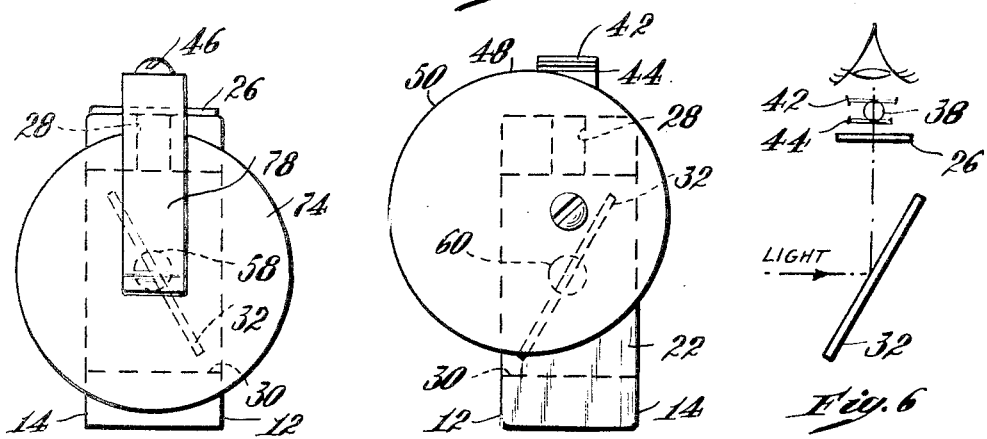
Fig. 3
Fig. 4
Fig. 6
Fig. 7
Fig. 5
INVENTORS
Martin Annis
George W. Clark
Edwin C. Williams, Jr.
by Roberts, Cushman & Grover
ATT'YS 3,391,975
SIMPLE MICROSCOPE HAVING SUPPORT BLOCK FOR ADJUSTABLE MAGNIFIER LENS AND ADJUSTABLE ILLUMINATING MIRROR
Martin Annis, Newtonville, George W. Clark, Brookline, and Edwin C. Williams, Jr., Southboro, Mass., assignors to American Science and Engineering, Inc., Cambridge, Mass., a corporation of Massachusetts
Filed Sept. 1, 1964, Ser. No. 393,665
5 Claims. (Cl. 350—238)

ABSTRACT OF THE DISCLOSURE

A student's microscope comprising a block having broad and narrow faces, a cantilever-supported lens mounted on one of the narrow faces above a hole therein which provides a line of sight to a mirror located in a hole in the broad faces whereby light from the mirror is transmitted through the hole and a specimen mounted on the narrow face above the hole to the lens, and a cam rotatably secured to an end of the block with its edge engaged with the free end of the cantilever support rotatable to effect focusing the lens on the specimen.

---

The principal objects are to provide a microscope for elementary student use; to provide a microscope which is of very simple construction and yet affords a high degree of magnification and resolution; to provide a microscope in which the magnification may be increased or decreased to suit the need without difficulty or expense; to provide a microscope in which the component parts are readily available and require no precision manufacturing techniques to afford the aforesaid magnification and resolution; to provide a microscope which is so simple in its make-up and operation as to require no instructions for its use; to provide a microscope which is inexpensive enough to enable furnishing each member of the class with a microscope for his own individual use and which may be replaced if accidentally damaged with little expense; and to provide a microscope which is sturdy, reliable and attractive in appearance.

As herein illustrated, the microscope comprises a support including a stage containing an opening over which a slide may be placed, a lens, a flexible holder mounting the lens above the opening in the stage, means fixing one end of the holder to the support, a cam on the support with which the opposite end of the holder is engaged and by means of which the holder may be raised and lowered with respect to the stage, a mirror, and means for supporting the mirror below the opening in the stage for transmitting light through the opening to illuminate the slide from the underside. The holder comprises superposed, flat, elongate parts secured at one end to the support and resting at their opposite ends on the peripheral surface of the cam which is an eccentrically mounted disc manually rotatable to raise and lower the holder and hence the lens. The parts contain aligned apertures and the lens, which is in the form of a glass bead, is lodged between the parts by engagement of diametrically opposed portions thereof with the respective apertures, the latter providing sights through the parts and the interposed bead. The mirror is mounted below the opening between the ends of axially spaced trunnions, the latter being mounted on the support for rotation and axial movement relative to each other. The adjacent ends of the trunnions contain recesses within which set the diagonal corners of the mirror. The remote end of one trunnion bears against the inside of the cam disc and the remote end of the other trunnion has fixed to it a circular disc by means of which it may be rotated. A spring secured to the support in engagement with the latter disc operates by engagement therewith to thrust the trunnions axially toward the cam disc so as to cause the end of the trunnion having engagement with the cam disc to frictionally resist rotation thereof and so as to clamp the mirror between the adjacent ends.

The glass bead lens is in the order of 5/32 of an inch in diameter, is comprised of lime glass, may be readily removed from between the superposed parts of the flexible holder and replaced with a bead of different size to obtain different magnification, and the radius of movement of the bead to and from the stage is in the order of twelve times the diameter of the bead. The support is in the form of a block of wood, the holder in the form of flat metal springs, the cam and disc are wood, the mirror a piece of silvered glass and the trunnions wooden dowels. The foregoing component parts however may be comprised of any suitable material which is readily available.

The invention will now be described in greater detail with reference to the accompanying drawings wherein:
FIG. 1 is a front elevation of the microscope;
FIG. 2 is a top view of FIG. 1;
FIG. 3 is an elevation taken from the left end of FIG. 1;
FIG. 4 is an elevation taken from the right end of FIG. 1;
FIG. 5 is an enlarged fragmentary section showing a portion of the lens holder and lens;
FIG. 6 diagrammatically illustrates the path of light from the mirror through the slide, apertures in the lens holder and lens to the eye; and
FIG. 7 is a plan view of a slide showing a specimen mounted thereon.

Referring to the drawings, the microscope has a support 10 of rectangular configuration having spaced parallel side surfaces 12 and 14 and spaced parallel top, bottom and end surfaces 16, 18, 20 and 22. The surface 16 is uniformly flat and provides a stage 24 upon which may be placed a glass slide 26, or the like, of conventional kind. The stage has a vertical opening 28 which extends downwardly from its surface into a circular opening 30 extending at right angles thereto through the surfaces 12 and 14. A rectangular mirror 32 comprised of a piece of silvered glass is mounted in the opening 30 below the opening 32 for the purpose of supplying light to the underside of the slide to illuminate a specimen 34 attached to the slide as shown in FIG. 7. A flat flexible spring finger 36 (FIG. 1) fastened to the surface 16 of the support provides for removably holding the slide on the stage with the specimen positioned above the opening 28.

A lens 38 in the form of a glass bead is supported above the stage for movement to and from the stage by a holder 40. The holder comprises superposed, flat, elongate metal parts 42 and 44 of flexible resilient material and these are fastened at one end to the upper surface 16 adjacent one end of the support by means of a screw 46 with suitable spacers in the form of washers therebetween. The opposite ends of the parts 42 and 44 rest on the peripheral surface 48 of a cam 50 which is in the form of a circular disc eccentrically mounted on the end 22 of the support by means of a screw 52 which permits rotating the cam and thus raising and lowering the lens holder relative to the stage and the specimen supported slide resting thereon.

The parts 42 and 44 have aligned apertures 54 and 56 (FIG. 5) therein and the lens 38 is lodged between these parts with diametrically opposed portions engaged within the apertures thus fixing the position of the lens with respect to the opening 28 and yet enabling easily removing the lens for substitution of a lens of a larger or smaller diameter. The lens shown herein is in the form of a glass bead having a diameter in the order of 5/32 of an inch. The glass bead is comprised of soft lime glass and different diameters may be employed, for example from 3/32 up to 7/32 depending upon the magnification desired. Conveniently, the glass bead has a small tail 38a projecting from it formed in its manufacture which affords a handle and which facilitates removing and replacing the bead. The holder is so proportioned that adjustment of the lens to and from the stage is about a radius approximately twelve times the diameter of the bead. The apertures 54 and 56 are of relatively small diameter, for example in the order of 1/16 of an inch, and provide a sight through the bead which restricts sighting close enough to the diameter of the bead to eliminate aberration. The diameter of the apertures may range from 3/64 to 5/64 depending upon the size of the bead.

The mirror 32 is supported between axially spaced trunnions 58 and 60 parallel to the surface 16 within bores 62 and 64 for rotation about their axes and movement axially relative to each other. The adjacent ends 66 and 70 of the trunnions are recessed to receive the diagonal corners of the mirror to enable frictionally clamping the mirror between them. The remote end 72 of the trunnion 58 extends outwardly beyond the end 20 and has fastened to it a circular disc 74 by means of which the trunnion may be rotated and, in turn, rotate the mirror. The remote end 76 of the trunnion 60 extends beyond the end 22 and bears upon the inner surface of the cam 50. A spring finger 78, which conveniently forms an integral extension of the part 42, bears against the outer face of the disc 74, preferably at the center, and by such yielding engagement urges the trunnion 58 toward the trunnion 60 to press the outer end 76 of the trunnion 60 into frictional engagement with the cam 50 and at the same time to clamp the mirror between the adjacent ends 66 and 70. The frictional engagement of the end 76 with the trunnion 60 with the cam prevents accidental displacement without interfering with rotation of the cam when desired for the purpose of focusing the lens on the specimen. Engagement of the terminal end of the spring 78 with the disc 74 prevents displacement of the mirror without interfering with adjustment of the mirror when such adjustment is desired to obtain maximum lighting.

As herein illustrated, the support is in the form of a wooden block, the cam and disc are comprised of wood, the trunnions are wooden dowels, the spring finger 36 and parts 42 and 44 of the holder, including the spring finger 78, are comprised of flat spring metal, the lens is a soft lime glass bead, and the mirror is a piece of silvered glass or stainless steel. It is to be understood however that the foregoing parts may be made entirely of plastic or of any other suitable material or combinations of material which will embody the constructional features described above.

It should be understood that the present disclosure is for the purpose of illustration only and that this invention includes all modifications and equivalents which fall within the scope of the appended claims.

We claim:

1. A student's microscope comprising a block having spaced parallel broad faces, spaced parallel narrow faces between and at right angles to said broad faces and rectangular end faces perpendicular to the broad and narrow faces, said block containing midway between its end faces in the broad faces a circular hole of relatively large diameter which extends through the block from one broad face to the other, a circular hole of relatively small diameter midway between said end faces in one of the narrow faces extending therefrom through the block into the hole of relatively large diameter, and holes midway between the narrow faces in the end faces, one at each end, extending from said ends through the blocks into the hole of relatively large diameter, lens-supporting means on the narrow face containing the hole of relatively small diameter, a lens mounted on said lens-supporting means above said hole, said lens-supporting means being movable toward and from said narrow face so as to move the lens substantially linearly relative to the axis of the hole, a pair of trunnions rotatably mounted in the holes at the ends of the block with their inner ends extending into the hole of relatively large diameter, said inner ends containing recesses for receiving the diagonal corners of a rectangular mirror mounted in the hole, a mirror mounted in the hole between the inner ends of said trunnions, means yieldably urging one of the trunnions toward the other so as to hold the mirror clamped between said inner ends for rotation about the axis of the trunnions, means for rotating one of the trunnions to adjust the angle of the mirror relative to the line of sight of the lens, and means associated with the lens support operable to adjust the lens along said line of sight relative to a specimen mounted on said narrow face over said hole therein.

2. A student's microscope according to claim 1, wherein a disc is fixed to the outer end of one of the trunnions by means of which the trunnion is rotatable to adjust the angle of the mirror relative to the line of sight of the lens through the hole.

3. A student's microscope according to claim 1, wherein a cam disc is mounted on one end face of the block for rotation about an axis eccentric to its center and parallel to the axis of the trunnions with a portion of its peripheral edge in engagement with the lens support, and a portion of its lateral surface overlapping the end of the trunnion situated in the hole at that end of the block, said overlapping portion of the disc holding the trunnion axially stationary with its inner end at a predetermined position in said hole of large diameter.

4. A student's microscope according to claim 3, wherein the lens support comprises a cantilever-supported member secured at one end to said narrow face of the block containing the small diameter hole and supported at its other end by engagement with said cam disc.

5. A student's microscope according to claim 4, in which the cantilever-supported member comprises two narrow, flexible members supported in closely spaced relation and containing registering holes located above said hole of smaller diameter in said narrow face, and said lens comprising a glass bead, of greater diameter than the space between the members, supported between the members in said holes.

References Cited

UNITED STATES PATENTS

| 93,895 | 8/1869 | Logan | 350—238 |
| 2,080,172 | 5/1937 | Fiske | 350—241 |

FOREIGN PATENTS

| 16,992 | 1888 | Great Britain. |
| 131,216 | 2/1949 | Australia. |

DAVID H. RUBIN, *Primary Examiner.*

M. J. TOKAR, *Assistant Examiner.*